*(12)* United States Patent
Yeo (10) Patent No.: US 9,860,432 B2
(45) Date of Patent: Jan. 2, 2018

(54) LENS DRIVING APPARATUS AND CAMERA MODULE INCLUDING FUNCTION OF SHAKING COMPENSATION

(71) Applicant: LG INNOTEK CO., LTD., Seoul (KR)

(72) Inventor: In Jae Yeo, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 14/411,788

(22) PCT Filed: Jun. 28, 2013

(86) PCT No.: PCT/KR2013/005777
§ 371 (c)(1),
(2) Date: Dec. 29, 2014

(87) PCT Pub. No.: WO2014/003493
PCT Pub. Date: Jan. 3, 2014

(65) Prior Publication Data
US 2015/0168679 A1    Jun. 18, 2015

(30) Foreign Application Priority Data

Jun. 29, 2012 (KR) .......................... 10-2012-0071201

(51) Int. Cl.
*H04N 5/225*    (2006.01)
*G03B 5/00*    (2006.01)
(Continued)

(52) U.S. Cl.
CPC ......... *H04N 5/2254* (2013.01); *G02B 13/001* (2013.01); *G03B 5/00* (2013.01);
(Continued)

(58) Field of Classification Search
CPC ............ H04N 5/23287; H04N 5/2254; H04N 5/2253; H04N 5/2257; H04N 5/2328; G03B 5/00; G03B 13/34
(Continued)

(56) References Cited

U.S. PATENT DOCUMENTS 7,596,309 B2 * 9/2009 Hsiao ..................... G03B 17/02
359/824
7,845,867 B2    12/2010 Huang et al.
(Continued)

FOREIGN PATENT DOCUMENTS

CN    101551500 A    10/2009
JP    2001-034971 A    2/2001
(Continued)

OTHER PUBLICATIONS

International Search Report in International Application No. PCT/KR2013/005777, filed Jun. 28, 2013.

*Primary Examiner* — Antoinette Spinks
(74) *Attorney, Agent, or Firm* — Saliwanchik, Lloyd & Eisenschenk (57) ABSTRACT

Disclosed is a camera module. The camera module includes: a lens barrel disposed in a housing to receive a lens assembly; an elastic member in at least one of the housing and the lens barrel; a driving unit moving the lens barrel relative to the housing; and a sensor unit fixed to the housing.

20 Claims, 3 Drawing Sheets

(51) Int. Cl.
    *G03B 13/34*    (2006.01)
    *G02B 13/00*    (2006.01)
(52) U.S. Cl.
    CPC ........... *G03B 13/34* (2013.01); *H04N 5/2257* (2013.01); *G03B 2205/0007* (2013.01); *G03B 2205/0046* (2013.01); *G03B 2205/0053* (2013.01)
(58) Field of Classification Search
    USPC .............. 348/374, 373, 208.11, 208.99, 345; 396/55; 359/557
    See application file for complete search history.

(56) References Cited

U.S. PATENT DOCUMENTS

| | | | |
|---|---|---|---|
| 2004/0207745 A1 | 10/2004 | Tsuruta et al. | |
| 2009/0180202 A1 | 7/2009 | Knoedgen | |
| 2009/0252489 A1* | 10/2009 | Huang | G03B 17/00 396/529 |
| 2010/0033835 A1 | 2/2010 | Heim et al. | |
| 2010/0103540 A1 | 4/2010 | An et al. | |
| 2011/0176046 A1 | 7/2011 | Hu et al. | |
| 2011/0217029 A1 | 9/2011 | Wu et al. | |
| 2011/0236008 A1 | 9/2011 | Kang et al. | |
| 2011/0286732 A1* | 11/2011 | Hosokawa | G03B 3/02 396/55 |
| 2012/0099201 A1 | 4/2012 | Chan et al. | |
| 2012/0106936 A1* | 5/2012 | Lim | G03B 5/02 396/55 |
| 2012/0154614 A1 | 6/2012 | Moriya et al. | |
| 2012/0182436 A1* | 7/2012 | Hu | H04N 5/23287 348/208.99 |
| 2013/0039640 A1* | 2/2013 | Sekimoto | G03B 17/00 396/55 |
| 2013/0070148 A1 | 3/2013 | Kim | |
| 2013/0088788 A1* | 4/2013 | You | G02B 13/0045 359/714 |
| 2013/0089311 A1 | 4/2013 | Jung et al. | |
| 2013/0121672 A1 | 5/2013 | Shikama et al. | |

FOREIGN PATENT DOCUMENTS

| | | |
|---|---|---|
| JP | 2005073130 A | 3/2005 |
| JP | 2008-176185 A | 7/2008 |
| JP | 2011-065140 A | 3/2011 |
| JP | 2011085666 A | 4/2011 |
| JP | 2011-128583 A | 6/2011 |
| JP | 2011-203283 A | 10/2011 |
| JP | 2011-203476 A | 10/2011 |
| JP | 2011-227427 A | 11/2011 |
| JP | 2011-227428 A | 11/2011 |
| JP | 2011-247909 A | 12/2011 |
| JP | 2012-058762 A | 3/2012 |
| JP | 2012-103376 A | 5/2012 |
| JP | 2012-150421 A | 8/2012 |
| JP | 2012-238029 A | 12/2012 |
| KR | 10-2006-0002185 A | 1/2006 |
| KR | 1020060130857 A | 12/2006 |
| KR | 10-0742978 B1 | 7/2007 |
| KR | 10-2007-0101628 A | 10/2007 |
| KR | 10-0918816 B1 | 9/2009 |
| KR | 1020090131925 A | 12/2009 |
| KR | 10-0952620 B1 | 4/2010 |
| KR | 1020100048361 A | 5/2010 |
| KR | 10-0965913 B1 | 6/2010 |
| KR | 10-2010-0104962 A | 9/2010 |
| KR | 10-1017341 B1 | 2/2011 |
| KR | 10-2011-0050161 A | 5/2011 |
| KR | 10-1069619 B1 | 10/2011 |
| TW | 201129822 A | 9/2011 |
| WO | WO-2011021559 A1 | 2/2011 |
| WO | WO-2011/078614 A2 | 6/2011 |

* cited by examiner

LENS DRIVING APPARATUS AND CAMERA MODULE INCLUDING FUNCTION OF SHAKING COMPENSATION

CROSS-REFERENCE TO RELATED APPLICATIONS

This application is the U.S. national stage application of International Patent Application No. PCT/KR2013/005777, filed Jun. 28, 2013, which claims priority to Korean Application No.10-2012-0071201, filed Jun. 29, 2012, the disclosures of each of which are incorporated herein by reference in their entirety.

TECHNICAL FIELD

The embodiment relates to a camera module.

BACKGROUND ART

Recently, a camera module has been installed in a mobile communication terminal, an information technology (IT) device, such as a PDA or an MP3 player, a vehicle, and an endoscope. As the technology has been developed toward the high-pixel camera module from the conventional VGA camera equipped with 0.3 mega pixels, the camera module has been manufactured in a small size with a slim structure according to targets to which the camera module is installed. In addition, the camera module has been equipped with various additional functions, such as auto-focusing or optical zoom functions, at the low manufacturing cost.

Meanwhile, the camera module manufactured in these days is equipped with an image sensor module, which is manufactured through a COB (chip of board) scheme, a COF (chip of flexible) scheme or a CSP (chip scale package) scheme, and is usually connected to a main substrate through an electric connection unit, such as a PCB (printed circuit board) or an FPCB (flexible printed circuit board).

However, users recently request the camera module, which can be directly mounted on the main substrate similar to a general passive element, in such a manner that the manufacturing process for the camera module can be simplified while reducing the manufacturing cost.

The camera module is generally manufactured by attaching an image sensor, such as a CCD or a CMOS, to a substrate through a wire bonding scheme or a flip chip scheme. An image of a subject is focused by the image sensor and the focused image is stored as data in a memory, which is installed inside or outside the camera module. In addition, the stored data are converted into electric signals and the electric signals are displayed as images through a display medium, such as an LCD or a PC monitor provided in a device.

A camera module according to the related art includes a housing, an image sensor supported on a bottom of the housing to convert an image signal received through a lens into an electric signal, a lens group to focus an image signal of a subject to the image sensor, and a barrel in which the lens group are stacked. The housing, the lens group and the barrel are sequentially coupled with each other.

In addition, an FPCB mounted thereon with chip components, which are electric components serving as a condenser and a resistor to drive the image sensor including a CCD or a CMOS, is electrically connected to the bottom of the housing.

In the camera module having the above structure according to the related art, in a state that a plurality of circuit components have been mounted on the FPCB, an ACF (anisotropic conductive film) is inserted between the substrate and the image sensor, and heat and pressure are applied thereto in such a manner that the substrate, the image sensor and the ACF are fixedly bonded and conducted with each other and an IR cut-off filter is attached to an opposite side.

In addition, in a state that the barrel provided therein with a plurality of lens groups is temporally screw-coupled with the housing, as described above, the assembled PCB used for mounting devices is fixedly bonded to the bottom of the housing by an adhesive.

Meanwhile, after the PCB, to which the image sensor is attached, has been fixedly bonded to the housing coupled with the barrel, a focus adjustment is carried out with respect to a subject (resolution chart) located in front of the barrel and spaced apart from the barrel by a predetermined distance. At this time, the focus adjustment of the camera module can be achieved between the lens group and the image sensor while adjusting the vertical displacement by rotating the barrel screw-coupled with the housing.

DISCLOSURE OF INVENTION

Technical Problem

The embodiment provides a camera module capable of effectively preventing hand-shaking.

Solution to Problem

According to the embodiment, there is provided a camera module including: a lens barrel disposed in a housing to receive a lens assembly; an elastic member in at least one of the housing and the lens barrel; a driving unit moving the lens barrel relative to the housing; and a sensor unit fixed to the housing.

Advantageous Effects of Invention

The camera module according to the embodiment can compensate for hand-shaking by driving the lens barrel with respect to the housing. That is, the driving unit can compensate for hand-shaking by moving the lens barrel relative to the housing.

Particularly, the camera module according to the embodiment allows an image formed on the sensor unit to have a negative distortion by the lens assembly. Accordingly, when the shaking is compensated for by moving the lens barrel, an error at an outer peripheral portion of the image can be minimized.

MODE FOR THE INVENTION

In the description of the embodiments, it will be understood that when each lens, unit, part, hole, protrusion, groove or layer is referred to as being "on" or "under" another lens, unit, part, hole, protrusion, groove or layer, it can be "directly" or "indirectly" on the other lens, unit, part, hole, protrusion, groove or layer or one or more intervening layers may also be present. Such a position has been described with reference to the drawings. The thickness and size of each layer shown in the drawings may be exaggerated, omitted or schematically drawn for the purpose of convenience or clarity. In addition, the size of elements does not utterly reflect an actual size.

Figure 1:
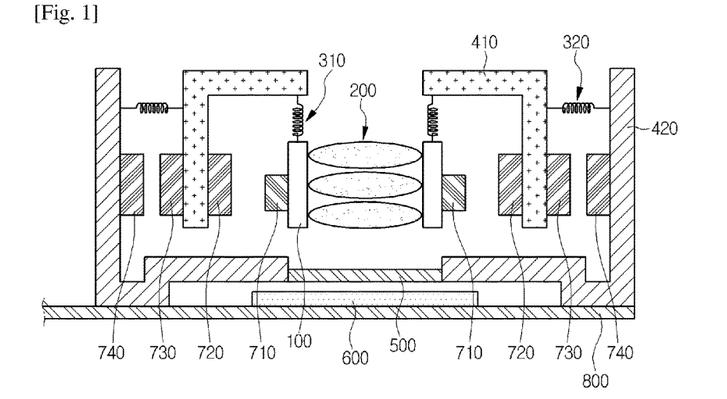
FIG. 1 is a sectional view showing a camera module according to the embodiment.
Figure 2:
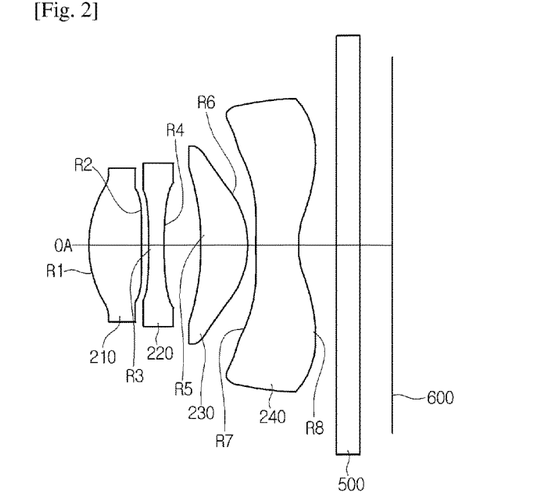
FIG. 2 is a diagram illustrating an optical system including a lens assembly, an infrared (IR) cut-off filter unit, and a sensor unit.
Figure 3:
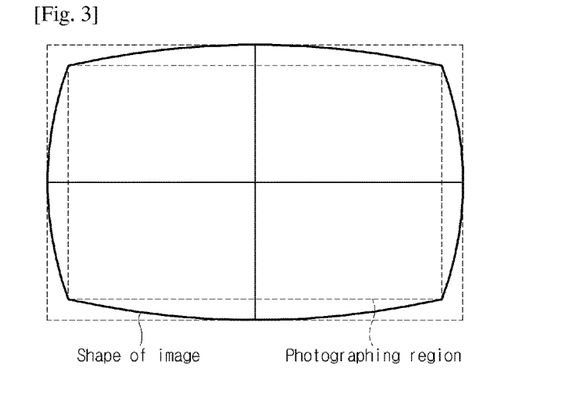
FIG. 3 is a diagram illustrating an image incident onto the sensor unit through the lens assembly.
Figure 4:
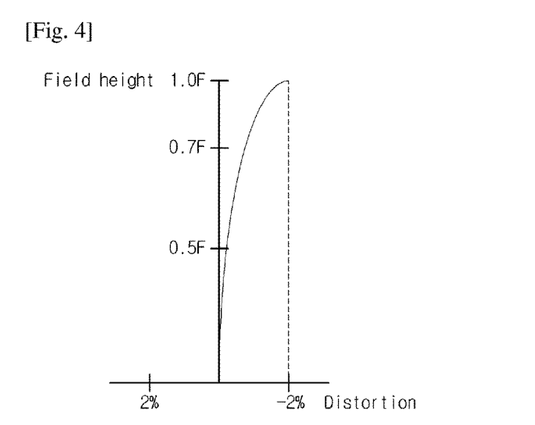
FIG. 4 is a diagram illustrating distortion in an optical system including a lens assembly, an IR cut-off filter unit, and a sensor unit.
Figure 5:
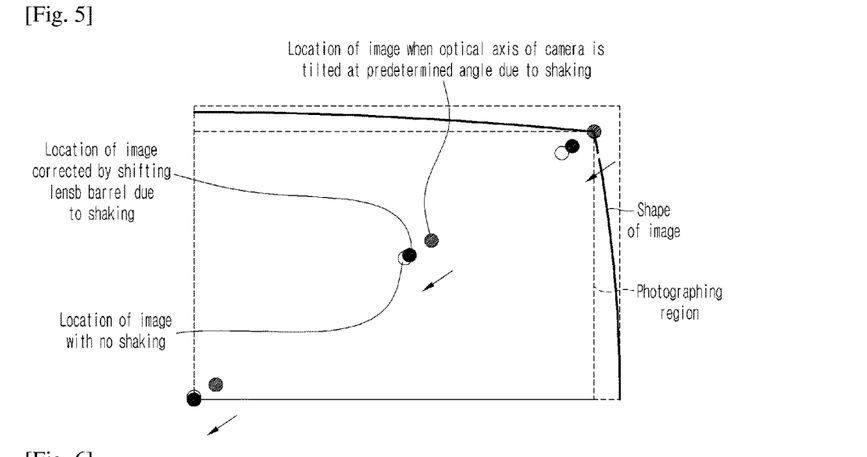
FIG. 5 is a diagram illustrating movement of an image due to hand-shaking and compensation thereof.

FIG. 1 is a diagram showing a camera module according to the embodiment. FIG. 2 is a diagram illustrating an optical system including a lens assembly, an IR cut-off filter unit, and a sensor unit. FIG. 3 is a diagram illustrating an image incident onto the sensor unit through the lens assembly. FIG. 4 is a diagram illustrating distortion in an optical system including a lens assembly, an IR cut-off filter unit, and a sensor unit. FIG. 5 is a diagram illustrating movement of an image due to hand-shaking and compensation thereof.

Referring to FIGS. 1 to 5, the camera module according to the embodiment includes a lens barrel 100, a lens assembly 200, a first elastic member 310, a second elastic member 320, a first housing 410, a second housing 420, an IR cut-off filter unit 500 and a sensor unit 600, a circuit board 800, and driving units 710, 720, 730, and 740.

The lens barrel 100 receives the lens assembly 200 therein. The lens barrel 100 has a receiving groove for receiving the lens assembly 200. The receiving groove may have a shape corresponding to a shape of the lens assembly 200.

The lens barrel 100 may have a rectangular shape or a cylindrical shape. That is, the outer portion of the lens barrel 100 may have a rectangular shape or a circular shape.

The lens barrel 100 may be connected with the first housing 410. In detail, the lens barrel 100 is connected to the first housing 410 through the first elastic member 310. That is, the lens barrel 100 may be movably connected to the first housing 410 by the first elastic member 310.

In addition, the lens barrel 100 includes a light incident groove, which is open upward (toward an object). The light incident groove exposes the lens assembly 200. An image is incident into the lens assembly 200 through the light incident groove.

The lens assembly 200 is disposed in the lens barrel 100. In detail, the lens assembly 200 is disposed in the receiving groove. The lens assembly 200 is inserted into the receiving groove. In more detail, the outer portion of the lens assembly 200 may have a circular shape. In more detail, the outer portion of the lens assembly 200 may have a circular shape when viewed from the top. In addition, the lens assembly 200 may have a rectangular shape when viewed from the top.

The lens assembly 200 includes a plurality of lenses 210, 220, 230, and 240. For instance, the lens assembly 200 may include a first lens 210, a second lens 220, a third lens 230 and a fourth lens 240. The third lens 230, the second lens 220, and the first lens 210 may be sequentially laminated.

Further, a first spacer and a second spacer may be interposed among the lenses 210, 220, 230, and 240. The lenses 210, 220, 230, and 240 are spaced apart from each other through the first spacer and the second spacer.

Although it has been described that the lens assembly 200 includes four lenses, the embodiment is not limited thereto. That is, the lens assembly 200 may include one to three lenses or at least five lenses.

Referring to FIG. 2, the lens assembly 200, the IR cut-off filter unit 500, and the sensor unit 600 constitute the optical system.

The first lens 210, the second lens 220, the third lens 230, and the fourth lens 240 may be sequentially disposed from the object side to the image side. In order to acquire an image of a subject, light corresponding to image information of the subject is incident to the sensor unit 600 by passing through the first lens 210, the second lens 220, the third lens 230, the fourth lens 240, and the IR cut-off filter unit 500.

The first lens 210 may have positive (+) refractive power, the second lens 220 may have negative (−) refractive power, the third lens 230 may have the positive (+) refractive power, and the fourth lens 240 may have the negative (−) refractive power. Further, the first lens 210, the second lens 220, the third lens 230, and the fourth lens 240 may include glass or plastic.

The first lens 210 has a convex surface at the object side R1 thereof, and the first lens 210 has a convex, concave, flat surface at the image side R2 thereof. Further, the first lens 210 may have an aspherical or spherical surface at the object side R1 thereof. Preferably, the first lens 210 has double-convex surfaces in the vicinity of an optical axis.

A curvature of the image side R2 of the first lens 210 may satisfy the following equation 1.

$$0 \leq R < 0.01 \qquad \text{Equation 1}$$

In detail, the curvature of the image side R2 of the first lens 210 may satisfy the following equation 7.

$$0 \leq R < 0.001 \qquad \text{Equation 7}$$

In more detail, the curvature of the image side R2 of the first lens 210 may be zero (0).

That is, the image side R2 of the first lens 210 may have a very small curvature. The image side R2 of the first lens 210 may include the flat surface. The image side R2 of the first lens 210 may have the flat surface or a curved surface similar to the flat surface. The image side R2 of the first lens 210 is similar to the flat surface so that tolerance of a small optical system according to the embodiment may be reduced.

The second lens 220 may have a meniscus shape. The second lens 220 may have a concave surface at the object side R1 thereof and the second lens 220 may have a concave surface at the image side R4 thereof. That is, the second lens 220 may have double-concave shapes. In addition, the second lens 220 may have a spherical or aspherical surface at the object side R3 and the image side R4 thereof. It is preferable that the second lens 220 has a meniscus shape where a concave surface is directed to the object side.

The third lens 230 has a convex surface at the image side thereof in the vicinity of the optical axis and has positive power. For example, the third lens 230 may have a concave surface at the object side thereof in the vicinity of the optical axis.

The third lens 230 may have a concave surface at the object side thereof and have a convex surface at the image side R6 thereof. In addition, the third lens 230 may have a spherical or aspherical surface at the object side R5 and the image side R6 thereof.

The focus length of the third lens 230 may satisfy the following equation 2.

$$0.5 < f3/F < 1.0 \qquad \text{Equation 2}$$

In Equation 2, f3 represents an effective focal distance of the third lens 230, and F represents a whole focus distance of a small optical system according to the embodiment.

In detail, the focus length of the third lens 230 may satisfy the following equation 4.

$$0.6 < f3/F < 0.9 \qquad \text{Equation 4}$$

The fourth lens 240 may have a meniscus shape. The fourth lens 240 may have a convex surface at an object side R7 thereof and the fourth lens 240 may have a concave surface at an image side R8 thereof. In addition, the fourth lens 240 may have an aspherical surface at the object side R7 and the image side R8 thereof.

Further, the fourth lens 240 includes at least one aspheric inflection point.

In this case, the at least one aspheric inflection point may be formed on the object side R7 of the fourth lens 240. In addition, the at least one aspheric inflection point CP may be formed on the image side R8 of the fourth lens 240. The aspheric inflection point of the fourth lens 240 may adjust the maximum radiation angle of a main light incident into the light receiving device 70.

The focus length of the fourth lens 240 may satisfy the following equation 3.

$$-10 < f4/F < -0.5 \qquad \text{Equation 3}$$

In Equation 3, f4 represents an effective focal distance of the fourth lens 240, and F represents a whole focus distance of a small optical system according to the embodiment.

In detail, the focus length of the third lens 230 may satisfy the following equation 5.

$$-1 < f4/F < -0.5 \qquad \text{Equation 5}$$

If the light receiving device 70 serving as an imaging surface R14 is a charge coupled device (CCD) or a complementary metal oxide semiconductor (CMOS), an angle to ensure the quantity of light exists with respect to each pixel. If a different angle is used in the pixel, the quantity of light is not ensured, a shading phenomenon in which an outer portion of the image is darkened.

Therefore, the maximum of incident angle of the main ray is adjusted by forming the aspheric inflection point at the image side R8 of the fourth lens 240 facing the image side, thereby preventing the outer portion of the image screen from being darkened.

The small optical system may satisfy the following Equation 6.

$$1 < tt1/F < 1.3 \qquad \text{Equation 6}$$

In Equation 6, tt1 represents a distance between the object side of the first lens 210 and the image side thereof, and F represents the whole effective focus length.

When the optical system of the embodiment is designed as described above, the optical system may have a negative distortion. That is, as shown in FIGS. 3 and 4, the optical system may have the negative distortion.

For example, when a field height is in the range of 0F to 1.0F in the optical system, a distortion of an image of the sensor unit 600 may be in the range of −2% to 0%.

In detail, when the field height is in the range of 0.7 F to 1.0 F in the optical system, the distortion of an image of the sensor unit 600 may be in the range of 0% to −2%.

In addition, when the field height is in the range of 0 F to 1.0 F in the optical system, the distortion of an image of the sensor unit 600 may be in the range of −2% to −5%.

In detail, when the field height is in the range of 0.7 F to 1.0 F in the optical system, the distortion of an image of the sensor unit 600 may be in the range of −2% to −5%.

The first elastic member 310 is disposed in the first housing 410. The first elastic member 310 is fixed to the first housing 410. Further, the first elastic member 310 is fixed to the lens barrel 100. The first elastic member 310 movably fixes the lens barrel 100 to the first housing 410.

The first elastic member 310 may include a spring. In detail, the first elastic member 310 may include a leaf spring.

The first housing 410 receives the lens barrel 100. The first housing 410 is connected to the lens barrel 100 through the first elastic member 310.

The first housing 410 may include plastic or metal. The first housing 410 may have a rectangular container shape.

The second housing 420 receives the first housing 410. That is, the first housing 410 is disposed in the second housing 420. The first housing 410 is connected to the second housing 420 by the second elastic member 320.

The first housing 410 is movably fixed in the second housing 420 by the second elastic member 320. The first housing 410 may float in the second housing 420.

The second housing 420 is fixed to the circuit board 800. The second housing 420 may be coupled with the circuit board 800. The second housing 420 may include plastic or metal.

The second elastic member 320 is connected to the first housing 410 and the second housing 420. The second elastic member 320 movably fixes the first housing 410 to the second housing 420. The second elastic member 320 may include a spring. In detail, the second elastic member 320 may include a leaf spring.

The IR cut-off filter unit 500 is disposed in the second housing 420. The IR cut-off filter unit 500 is fixed to the circuit board 800 and may be fixed to the second housing 420. The IR cut-off filter unit 500 filters an incident IR. The IR cut-off filter unit 500 may filter light having an excessively long wavelength introduced into the sensor unit 600.

The IR cut-off filter unit 500 may be formed by alternately depositing titanium oxide and silicon oxide on optical glass. In order to cut-off the IR, thicknesses of the titanium oxide and the silicon oxide may be suitable adjusted.

The sensor unit 600 is received in the second housing 420. The sensor unit 600 includes a CCD image sensor and a CMOS image sensor. In addition, the sensor unit 600 further includes the circuit board 800 connected to the image sensor. The sensor unit 600 converts an incident image into an electrical signal.

The sensor unit 600 is fixed to the circuit board 800. The sensor unit 600 may be mounted on the circuit board 800. The sensor unit 600 is electrically connected to the circuit board 800.

A photographing region of the sensor unit 600 may have the size of 2.5 mm×4.0 mm. Further, a unit cell of the sensor unit 600 may have length and breadth of 2 μm or less.

The circuit board 800 may cover a bottom of the second housing 420. The circuit board 800 is coupled with the second housing 420. The circuit board 800 may include a printed circuit board (PCB). The circuit board 800 may be electrically connected to the sensor unit 600. The circuit board 800 may apply a signal for driving the sensor unit 600. Further, the circuit board 800 may receive a signal from the sensor unit 600.

The sensor unit 600 is mounted on the circuit board 800. In detail, the sensor unit 600 may be fixed to the circuit board 800. That is, the sensor unit 600 may be fixed to the second housing 420 through the circuit board 800.

Further, the circuit board 800 may be electrically connected to the driving units 710, 720, 730, and 740. That is, a signal for driving the driving units 710, 720, 730, and 740 may be applied to the driving units 710, 720, 730, and 740 through the circuit board 800.

The driving units 710, 720, 730, and 740 drive the lens barrel 100 with respect to the first housing 410. The driving units 710, 720, 730, and 740 drive the first housing 410 with respect to the second housing 420.

The driving units 710, 720, 730, and 740 may move the lens barrel 100 and the first housing 410 by a magnetic force. The driving units 710, 720, 730, and 740 may include a first driving unit 710, a second driving unit 720, a third driving unit 730, and a fourth driving unit 740. The driving units 710, 720, 730, and 740 may move the lens barrel relative to the housing 400 by a magnetic force. In this case, the magnetic force may be applied to a direction inclined with respect to the optical axis OA of the lens assembly 200.

The first driving unit 710 is attached to the lens barrel 100. The first driving unit 710 may be fixed to the lens barrel 100. The first driving unit 710 may be disposed at an outer side of the lens barrel 100.

The first driving unit 710 may include a coil. The first driving unit 710 may receive a driving signal through the circuit board 800. The first driving unit 710 may generate a magnetic field according to an electrical signal.

The first driving unit 710 may apply an attractive force or a repulsive force to the second driving unit 720 in a direction inclined with respect to a reference horizontal plane. In this case, the first driving unit 710 may apply the magnetic force to the second driving unit 720 at an angle of about +20° to about +70° with respect to the reference horizontal plane. In detail, the first driving unit 710 may apply the magnetic force to the second driving unit 720 at an angle of about +30° to about +50° with respect to the reference horizontal plane R.

The second driving unit 720 is attached to the first housing 410. In detail, the second driving unit 720 may be fixed to the first housing 410. In more detail, the second driving unit 720 may be fixed to an inner side of the first housing 410.

The second driving unit 720 includes a magnetic material. The second driving unit 720 may have a plate shape. That is, the second driving unit 720 may be prepared as a plate magnet.

The first driving unit 710 is close to the second driving unit 720. The first driving unit 710 may be spaced apart from the second driving unit 720 by a very small distance. The distance between the first driving unit 710 and the second driving unit 720 may be in the range of about 50 μm to about 1000 μm. The first driving unit 710 may face the second driving unit 720. Accordingly, a magnetic field may be generated between the first driving unit 710 and the second driving unit 720.

The first driving unit 710 and the second driving unit 720 move the lens barrel 100 relative to the first housing 410. In detail, the first driving 710 and the second driving unit 720 may move the lens barrel 100 relative to the first housing 410 in an optical-axis direction of the lens assembly 200.

The third driving unit 730 is attached to the first housing 410. In detail, the third driving unit 730 may be fixed to the first housing 410. In more detail, the third driving unit 730 may be fixed to an outer side of the first housing 410.

The third driving unit 730 includes a magnetic material. The third driving unit 730 may have a plate shape. That is, the third driving unit 730 may be prepared as a plate magnet.

The fourth driving unit 740 is attached to the second housing 420. In detail, the fourth driving unit 740 may be fixed to the second housing 420. In more detail, the fourth driving unit 740 may be fixed to an inner side of the second housing 420.

The fourth driving unit 740 may include a coil. The fourth driving unit 740 may receive a driving signal through the circuit board 800. The fourth driving unit 740 may generates a magnetic field according to an electrical signal.

The third driving unit 730 is close to the fourth driving unit 740. The third driving unit 730 may be spaced apart from the fourth driving unit 740 by a very small distance. The distance between the third driving unit 730 and the fourth driving unit 740 may be in the range of about 50 μm to about 1000 μm. The third driving unit 730 may face the fourth driving unit 740. Accordingly, a magnetic force may be generated between the third driving unit 730 and the fourth driving unit 740.

The third driving unit 730 and the fourth driving unit 740 move the first housing 410 relative to the second housing 420. In detail, the third driving 730 and the fourth driving unit 740 may move the first housing 410 relative to the second housing 420 in a horizontal direction with respect to an optical axis of the lens assembly 200.

As a result, the driving units 710, 720, 730, and 740 may move the lens assembly 200 relative to the sensor unit 600 in the optical axis direction and in a direction horizontal to the optical axis.

For example, when the subject is horizontally moved due to shaking, the first housing 410 may be tilted or horizontally moved by the third driving unit 730 and the fourth driving unit 740. Accordingly, a relative horizontal location between the lens assembly 200 and the sensor 600 may be adjusted.

Further, a focus length between the lens assembly 200 and the sensor unit 600 may be adjusted by the first driving unit 710 and the second driving unit 720.

Particularly, since the optical system has a negative distortion, movement of an image according to shaking in a horizontal direction is minimized, and accordingly, a compensation error may be reduced.

That is, as shown in FIG. 5, in the camera module according to the embodiment, when an image is moved in the sensor unit 600 due to shaking, the driving units 710, 720, 730, and 740 move the lens barrel 100 in a direction opposite to a moving direction of the image. For example, the driving units 710, 720, 730, and 740 move the image to the initial position by horizontally moving or tilting the lens barrel 100.

In this case, since the optical system has a negative distortion, an error of an image according to movement of the lens barrel 100 may be minimized in an outer peripheral portion of the image.

That is, the optical system of the camera module according to the embodiment has the negative distortion, so it is possible to prevent the movement distance of the image from being increased due to the shaking as the image is located away from the optical axis.

Particularly, the camera module according to the embodiment can minimize image shaking at an outer peripheral portion of the photographing region and maximize a shaking correction effect.

Figure 6:
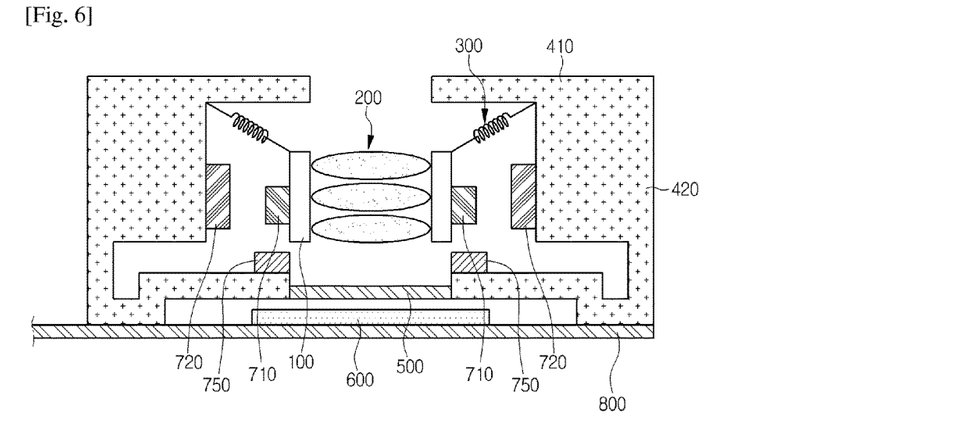
FIG. 6 is a sectional view showing a camera module according to another embodiment.

FIG. 6 is a diagram showing a camera module according to another embodiment. The embodiment will be described by making reference to the above description of the camera module. The description of the previous embodiment with respect to the camera module may be incorporated in the description of the embodiment except for the modifications.

Referring to FIG. 6, the first housing 410 may be omitted from the camera module according to the embodiment. Further, a second housing 420 may be directly connected to the lens barrel 100 through an elastic member. In this case, the elastic member may connect the lens barrel 110 to the second housing 420 in a direction inclined with respect to an optical axis of the lens assembly 200.

Further, a first driving unit 710 is attached to the lens barrel 110. The first driving unit 710 may include a magnetic material.

In addition, a fourth driving unit 740 is attached to an inner side of the second housing 420. The fourth driving unit 740 may include a coil.

A fifth driving unit 750 is attached onto the circuit board 800. In detail, the fifth driving unit 750 may be interposed between the first driving unit 710 and the circuit board 800. The fifth driving unit 750 may include a coil.

Further, the fourth driving unit 740 and the fifth driving unit 750 may be electrically to the circuit board 800.

The lens barrel 100 may be driven in a horizontal direction perpendicular to the optical axis by a magnetic force between the first driving unit 710 and the fourth driving unit 740. Moreover, the lens barrel 100 may be driven in the optical axis direction by a magnetic force between the first driving unit 710 and the fifth driving unit 750.

That is, the lens barrel 100 may be driven in the horizontal direction by the first driving unit 710 and the fourth driving unit 740. Further, the lens barrel 100 may be driven in the optical axis direction by the first driving unit 710 and the fifth driving unit 750.

The camera module according to the embodiment may correct shaking and adjust automatic focus by a simple structure.

Figure 7:
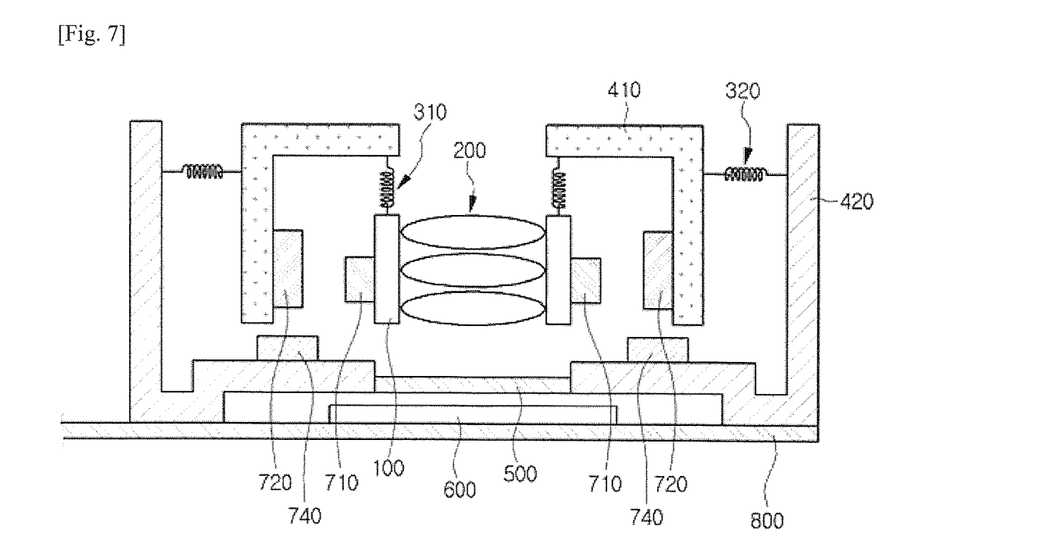
FIG. 7 is a sectional view showing a camera module according to another embodiment.

FIG. 7 is a diagram showing a camera module according to another embodiment. The embodiment will be described by making reference to the above description of the camera module. The description of the previous embodiment with respect to the camera module may be incorporated in the description of the embodiment except for the modifications.

Referring to FIG. 7, in the camera module according to the embodiment, a third driving unit 730 is omitted and a fourth driving unit 740 may be close to the second driving unit 720. In detail, the fourth driving unit 740 may be interposed between the second driving unit 720 and the circuit board 800.

Accordingly, the first housing 410 may be relatively moved according to an attractive force or a repulsive force between the second driving unit 720 and the fourth driving unit 740. In detail, the lens barrel 100 may be driven according to the attractive force or the repulsive force between the first driving unit 710 and the second driving unit 720, and the first housing 410 may be driven according to a magnetic force between the second driving unit 720 and the fourth driving unit 740. That is, the first driving unit 710 may share the second driving unit 720 with the fourth driving unit 740

Therefore, the camera module according to the embodiment may have reduced number of components and have the simple structure by omitting the third driving unit 730.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to affect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

The invention claimed is:

1. A lens driving apparatus comprising:
a housing comprising a first housing and a second housing disposed under the first housing, wherein the first housing comprises an upper wall and a side wall extending in a vertical direction from the upper wall;
a barrel disposed in the first housing;
a first elastic member connecting the barrel and the first housing such that the barrel moves relative to the first housing in the vertical direction;
a first coil disposed on an outer side of the barrel;
a magnet disposed on an inner surface of the side wall of the first housing and interacting with the first coil to move the barrel and the first coil relative to the first housing in the vertical direction; and
a second coil interacting with the magnet to move the first housing and the magnet such that the barrel moves relative to the second housing in a horizontal direction;
wherein the magnet comprises a lower surface, an upper surface, and side surfaces;
wherein the side surfaces of the magnet comprise a first side surface facing the first coil and a second side surface opposite to the first side surface,
wherein the upper surface of the magnet is overlapped with the upper wall of the first housing in the vertical direction,
wherein the first coil is facing the first side surface of the magnet in the horizontal direction, and
the second coil is facing the lower surface of the magnet in the vertical direction such that the first coil and the second coil share the magnet;
wherein the first side surface of the magnet meets both the lower surface of the magnet and the upper surface of the magnet,
wherein the second coil is disposed between the magnet and the second housing in the vertical direction and is disposed lower than a bottom surface of the barrel,
wherein in the vertical direction a width of the first side surface of the magnet is greater than a width of an area of the first coil facing the first side surface of the magnet, and
wherein in the horizontal direction a width between the first side surface of the magnet and the second side surface of the magnet is smaller than a width of an area of the second coil facing the lower surface of the magnet.

2. The lens driving apparatus according to claim 1, wherein the magnet has a shape of a plate,
wherein the first coil is fixed to the outer side of the barrel,
wherein the second housing supports the second coil, and
wherein the second coil is overlapped with the magnet in the vertical direction.

3. The lens driving apparatus according to claim 1, wherein the first coil and the magnet are used to perform focusing function such that the barrel and the first coil move relative to the upper wall of the first housing in the vertical direction under operation of the focusing function,
wherein the magnet and the second coil are used to perform a shaking compensation function such that the first housing and the magnet move relative to the second housing in the horizontal direction under operation of the shaking compensation function,
wherein the second side surface of the magnet is coupled to the inner surface of the side wall of the first housing, and
wherein the magnet and the first coil are disposed below the upper wall of the first housing.

4. The lens driving apparatus according to claim 1, wherein the second coil is fixed at the second housing.

5. The lens driving apparatus according to claim 1, further comprising a second elastic member coupled to the first housing and coupled to the second housing.

6. The lens driving apparatus according to claim 1, wherein the second housing comprises an opening arranged under the barrel in the vertical direction in such a manner that light from a subject passes through the barrel and through the opening of the second housing,
wherein the magnet faces and is exposed to the second coil in the vertical direction, and
wherein the first side surface of the magnet is perpendicular to the lower surface of the magnet.

7. The lens driving apparatus according to claim 1, wherein the first coil is spaced apart from the magnet by a distance in a range of from 50 μm to 1000 μm in the horizontal direction, and
wherein the second coil is spaced apart from the magnet by a distance in a range of from 50 μm to 1000 μm in the vertical direction.

8. The lens driving apparatus according to claim 1, wherein the area of the first coil facing the first side surface of the magnet is configured to be positioned between the upper surface of the magnet and the lower surface of the magnet when viewed from the horizontal direction.

9. The lens driving apparatus according to claim 1, wherein the lower surface of the magnet is configured to be positioned between both ends of the area of the second coil facing the lower surface of the magnet when viewed from the vertical direction.

10. The lens driving apparatus according to claim 1, wherein the first coil is positioned nearer to the lower surface of the magnet than to the upper surface of the magnet, at an initial position of the barrel.

11. The lens driving apparatus according to claim 1, wherein the second coil comprises a first portion facing and overlapped with the side wall of the first housing in the vertical direction, a second portion facing and overlapped with the lower surface of the magnet in the vertical direction, and a third portion overlapped with the upper wall of the first housing and not overlapped with the magnet in the vertical direction.

12. The lens driving apparatus according to claim 1, wherein at least a portion of the second coil is facing the first housing and is overlapped with the first housing in the vertical direction.

13. A lens driving apparatus comprising:
a housing comprising a first housing and a second housing under the first housing, wherein the first housing comprises an upper surface and a side surface extending in a vertical direction from the upper surface;
a barrel disposed in the housing;
a first elastic member fixed to the barrel and the first housing such that the barrel moves relative to the first housing in the vertical direction;
a first driving unit for moving the barrel relative to the housing; and
a second driving unit for moving the first housing relative to the second housing;
wherein the first driving unit comprises a first coil and a magnet and the second driving unit comprises a second coil and the magnet;
wherein the magnet comprises a lower surface, an upper surface, and side surfaces;
wherein the side surfaces of the magnet comprise a first side surface facing the first coil and a second side surface opposite to the first side surface;
wherein the upper surface of the magnet is overlapped with the upper surface of the first housing in the vertical direction,
wherein the first coil is facing the first side surface of the magnet in a horizontal direction, and
the second coil is facing the lower surface of the magnet in the vertical direction such that the first coil and the second coil share the magnet;
wherein the first side surface of the magnet meets both the lower surface of the magnet and the upper surface of the magnet;
wherein the second coil is disposed between the magnet and the second housing in the vertical direction and is disposed lower than a bottom surface of the barrel;
wherein in the vertical direction a width of the first side surface of the magnet is greater than a width of an area of the first coil facing the first side surface of the magnet, and
wherein in the horizontal direction a width between the first side surface of the magnet and the second side surface of the magnet is smaller than a width of an area of the second coil facing the lower surface of the magnet.

14. The lens driving apparatus according to claim 13, wherein the second housing supports the second coil,
wherein the second coil is overlapped with the magnet m the vertical direction, and
wherein the second side surface of the magnet is overlapped with the side surface of the first housing in the horizontal direction.

15. The lens driving apparatus according to claim 13, wherein the area of the first coil facing the first side surface of the magnet is configured to be positioned between the upper surface of the magnet and the lower surface of the magnet when viewed from the horizontal direction, and
wherein the lower surface of the magnet is configured to be positioned between both ends of the area of the second coil facing the lower surface of the magnet when viewed from the vertical direction.

16. The lens driving apparatus according to claim 13, wherein at least a portion of the second coil faces the first housing and is overlapped with the first housing in the vertical direction.

17. A camera module comprising:
a lens driving apparatus comprising:
a housing comprising a first housing and a second housing disposed under the first housing, wherein the first housing comprises an upper wall and a side wall extending in a vertical direction from the upper wall;
a barrel disposed in the first housing;
a first elastic member connecting the barrel and the first housing such that the barrel moves relative to the first housing in the vertical direction;
a first coil disposed on an outer side of the barrel;
a magnet disposed on an inner surface of the side wall of the first housing and interacting with the first coil to move the barrel and the first coil relative to the first housing in the vertical direction;
a second coil interacting with the magnet to move the first housing and the magnet such that the barrel moves relative to the second housing in a horizontal direction;
a lens assembly disposed in the barrel; and
an image sensor disposed below the second housing;
wherein the magnet comprises a lower surface, an upper surface, and side surfaces;
wherein the side surfaces of the magnet comprise a first side surface facing the first coil and a second side surface opposite to the first side surface;
wherein the upper surface of the magnet is overlapped with the upper wall of the first housing in the vertical direction;
wherein the first coil is facing the first side surface of the magnet in the horizontal direction and the second coil is facing the lower surface of the magnet in the vertical direction such that the first coil and the second coil share the magnet;
wherein the first side surface of the magnet meets both the lower surface of the magnet and the upper surface of the magnet;
wherein the second coil is disposed between the magnet and the second housing in the vertical direction and is disposed lower than a bottom surface of the barrel;
wherein in the vertical direction a width of the first side surface of the magnet is greater than a width of an area of the first coil facing the first side surface of the magnet, and
wherein in the horizontal direction a width between the first side surface of the magnet and the second side surface of the magnet is smaller than a width of an area of the second coil facing the lower surface of the magnet.

18. The camera module according to claim 17,
wherein the lens assembly comprises four lenses,
wherein a fourth lens disposed fourth from an object side among the four lenses comprises a meniscus shape, and
wherein the fourth lens comprises an aspheric inflection point.

19. The camera module according to claim 17, wherein a distance between the second coil and the image sensor remains constant under operation of a shaking compensation function, and
wherein a unit cell of the image sensor has a length of 2 μm or less or a breadth of 2 μm or less.

20. An information technology (IT) device comprising the camera module according to claim 17.

* * * * *